(12) United States Patent
Bangma et al.

(10) Patent No.: US 8,284,936 B2
(45) Date of Patent: Oct. 9, 2012

(54) VIRTUALLY INCREASING THE NUMBER OF CONTENT BROADCAST CHANNELS

(75) Inventors: Menno Remco Bangma, Den Haag (NL); Franklin Selgert, Berkel en Rodenrijs (NL)

(73) Assignees: Koninklijke KPN N.V., The Hague (NL); Nederlandse Organisatie voor Toepast-Natuurwetenschappelijk Onderzoek TNO, Delft (NL)

( * ) Notice: Subject to any disclaimer, the term of this patent is extended or adjusted under 35 U.S.C. 154(b) by 367 days.

(21) Appl. No.: 12/508,347

(22) Filed: Jul. 23, 2009

(65) Prior Publication Data

US 2010/0027792 A1  Feb. 4, 2010

(30) Foreign Application Priority Data

Jul. 30, 2008  (EP) .................................... 08161482

(51) Int. Cl.
*H04N 7/167* (2011.01)
(52) U.S. Cl. ..................................... 380/239
(58) Field of Classification Search ............ 726/27; 380/239, 277, 200, 201, 279, 281, 286; 709/229, 709/223, 225; 725/31
See application file for complete search history.

(56) References Cited

U.S. PATENT DOCUMENTS

| | | | |
|---|---|---|---|
| 5,619,247 A | | 4/1997 | Russo |
| 5,659,350 A | | 8/1997 | Hendricks et al. |
| 6,157,719 A | * | 12/2000 | Wasilewski et al. .......... 380/210 |
| 6,233,389 B1 | | 5/2001 | Barton et al. |
| 6,324,338 B1 | | 11/2001 | Wood et al. |
| 6,327,418 B1 | | 12/2001 | Barton |
| 6,360,053 B1 | | 3/2002 | Wood et al. |
| 6,698,020 B1 | | 2/2004 | Zigmond et al. |
| 7,120,253 B2 | * | 10/2006 | Ducharme et al. ............ 380/211 |
| 7,149,308 B1 | * | 12/2006 | Fruehauf et al. ............... 380/44 |
| 7,394,834 B2 | * | 7/2008 | Milner .......................... 370/535 |
| 7,489,780 B2 | * | 2/2009 | Dellow et al. ................. 380/239 |
| 2002/0083438 A1 | | 6/2002 | So et al. |
| 2003/0046100 A1 | * | 3/2003 | Yamauchi ........................ 705/1 |
| 2003/0206636 A1 | | 11/2003 | Ducharme et al. |
| 2005/0105732 A1 | | 5/2005 | Hutchings et al. |
| 2006/0101485 A1 | | 5/2006 | Nishimoto |

(Continued)

FOREIGN PATENT DOCUMENTS

EP     1100266 A2    5/2001

(Continued)

OTHER PUBLICATIONS

EBU Project Group B/CA, "Functional Model of a Conditional Access System", EBU Technical Review, European Broadcasting Union, Brussels, Belgium, No. 266, Dec. 1995, pp. 64-77.

(Continued)

*Primary Examiner* — Beemnet Dada
(74) *Attorney, Agent, or Firm* — McDonnell Boehnen Hulbert & Berghoff LLP (57) ABSTRACT

The invention mostly uses conventional procedures with regard to enabling specific end-user to decrypt encrypted content information, but supplies the decryption keys, which are identical for all end-users, only after the end-user has received the encrypted content information and after the end-user has received the subscription information comprised in the specific entitlement management data that specifies the individual rights to access the content information. This approach provides additional control over the conditions under which the content information is played-out by the end-user, and enables to temporally better manage the communication bandwidth available to the service provider.

12 Claims, 3 Drawing Sheets

U.S. PATENT DOCUMENTS

| | | |
|---|---|---|
| 2006/0123246 A1 | 6/2006 | Vantalon et al. |
| 2006/0206708 A1 | 9/2006 | Son et al. |
| 2007/0124252 A1 | 5/2007 | Higashi et al. |
| 2007/0133797 A1* | 6/2007 | Schipper et al. ............ 380/231 |
| 2007/0168287 A1 | 7/2007 | McCarthy et al. |
| 2007/0226448 A1 | 9/2007 | Hirayama et al. |
| 2008/0089516 A1 | 4/2008 | Cocchi et al. |

FOREIGN PATENT DOCUMENTS

| | | |
|---|---|---|
| EP | 1739967 | 1/2007 |
| EP | 1826931 | 8/2007 |
| WO | 01/50755 A1 | 7/2001 |
| WO | 02/052778 | 7/2002 |
| WO | 2004/010698 A1 | 1/2004 |

OTHER PUBLICATIONS

Kamperman, F. et al, "Conditional Access System Interoperability Through Software Downloading", IEEE Transactions on Consumer Electronics, IEEE Service Center, New York, NY, vol. 47, No. 1, Feb. 2001, pp. 47-54.

Guillou, L.C. et al, "Encipherment and Conditional Access", SMPTE Journal, SMPTE Inc., Scarsdale, NY, vol. 103, No. 6, Jun. 1994, pp. 398-406.

Hames, Roderick, "Computers and How They Work", Alton C. Crews Middle School: CS Dept-Articles (http://www.crews.org/curriculum/ex/compsci/articles/howcomput.htm), Copyright 1998, pp. 1-4.

* cited by examiner

VIRTUALLY INCREASING THE NUMBER OF CONTENT BROADCAST CHANNELS

CROSS REFERENCE TO RELATED APPLICATIONS

The present application claims priority to European Patent Application EP 08161482.8, filed in the European Patent Office on Jul. 30, 2008, the entire contents of which are incorporated herein by reference.

FIELD OF THE INVENTION

The invention relates to a method of providing a service to a specific one of a plurality of end-users for accessing content information, wherein the content information is provided to the specific end-user in an encrypted format. The format is such that both generic entitlement control data and specific entitlement management data are needed in order for the specific end-user to decrypt the encrypted content information. The invention further relates to data processing equipment and to control software for being installed on the equipment.

BACKGROUND ART

Worldwide, service providers have started offering audiovisual services to users of mobile and stationary data processing equipment via broadcast, multicast or unicast networks. The services use communication technologies based on, e.g., aerial connections, cable connections, or connections using satellite dishes. Examples of such communication technologies are DVB-H (Digital Video Broadcasting—Handheld, a mobile TV format), DVB-T (Digital Video Broadcasting—Terrestrial), T-DMB (terrestrial Digital Multimedia Broadcasting), S-DMB (satellite Digital Multimedia Broadcasting), ISDB-T (Integrated Services Digital Broadcasting—Terrestrial), DAB-IP (Digital Audio Broadcasting used for the transmission of IP (Internet Protocol data packets via DAB digital radio), MBMS (Multimedia Broadcast Multicast Service, offered via GSM or UMTS cellular networks) etc. Examples of such services are generally referred to as "Mobile TV" or "Digital TV", wherein audiovisual content information and other electronic files are distributed via point-to-multipoint networks to end-user devices.

In order to inform the end-user about the content information available from these services, a description of the content information is typically made available via a so called "Electronic Service Guide" (ESG), or an Electronic Program Guide (EPG). The expression "Electronic Program Guide" is often used to refer to an overview of services available to the end-user. Such an ESG functions as the entry-point for the end-user to all such services that are available. In order to receive a service at a mobile device, an end-user device retrieves an ESG. The ESG comprises service information data containing, e.g., a program guide (metadata including e.g. title, description, genre, time), subscription and billing information (price, URL to acquire the proper credentials and entitlements required to consume the content provided by the service), access method information (Service Discovery Protocols or: SDP's, IP addresses, MPEG2-TS PIDs etc), interactivity information (for, e.g., voting or gambling) and auxiliary data. The service information data, often configured in tables, provides information about the content service (audio, video and/or files). The content information can then be received through user interaction with the ESG.

Typically, Mobile TV broadcast networks and Digital TV broadcast networks are bandwidth-constrained and the number of allocated live broadcast channels is limited. Therefore, methods exist to distribute content during off-peak hours, such as night time, and to present these channels during prime time. Such methods virtually increase the amount of channels available to the end-user.

For example, the OMA BCAST standard defines both a distribution window and a presentation window for a broadcast program. The content can be received via the broadcast channel during such distribution windows for being stored locally at the receiver, but is scheduled to be presented to the end-user during the presentation window. In another example, such content could also be distributed via memory cards that are to be inserted into the end-user device. In yet another example, this content could also be downloaded from the Internet, and stored at the end-user device.

For the content provider, it is important to guarantee that such content is being played out only in a particular time window and that the content can only be consumed by the end-user under pre-determined conditions, e.g., as specified in the licensing agreement with the broadcaster, the agreement made with the advertiser, and/or the agreement with the end-user having subscribed to the service. The scheduled play out time is important, for example, because the advertiser is targeting a certain audience that is expected to watch the broadcast at the play-out time as scheduled.

SUMMARY OF THE INVENTION

Currently aforesaid control over the play-out time is only possible through a Digital Rights Management (DRM) system that is capable of controlling the storage as well as the play-out of the content, and that is aware of absolute time. In such a system the end-user device is equipped with a DRM agent and the device can securely obtain Rights Objects from a Rights Issuer. The content as distributed is then protected according to this system and stored locally at the device. The scheduling of the play-out is securely controlled by permissions and constraints that are carried within those Rights Objects. The scheduling is based on the presence of an absolute and secure clock inside the DRM agent so as to guarantee the proper play-out time specified by the service provider. Note that the Rights Objects only give access to content information based on conditions specified in advance, at the time of providing the Rights Objects to the end-users.

However, many broadcast content protection systems do not have, or do no use, DRM agents that are aware of absolute time. For example, the OMA BCAST Smartcard profile relies on security by making use of a Universal Subscriber Identity Module (USIM). This system is not capable of managing play-out times of stored content. Furthermore, there are scenarios possible under which at least part of the conditions for accessing the content information can only be defined afterwards.

Therefore, there exists a need to provide an additional mechanism to manage access to content information, downloaded in advance from, e.g., the broadcast channel during off-peak hours or from the Internet, or distributed in advance via a memory card, a CD or a DVD, or another physical data carrier, etc.

An object of the invention is to fulfill this need, and the invention is based on the following.

Figure 1:
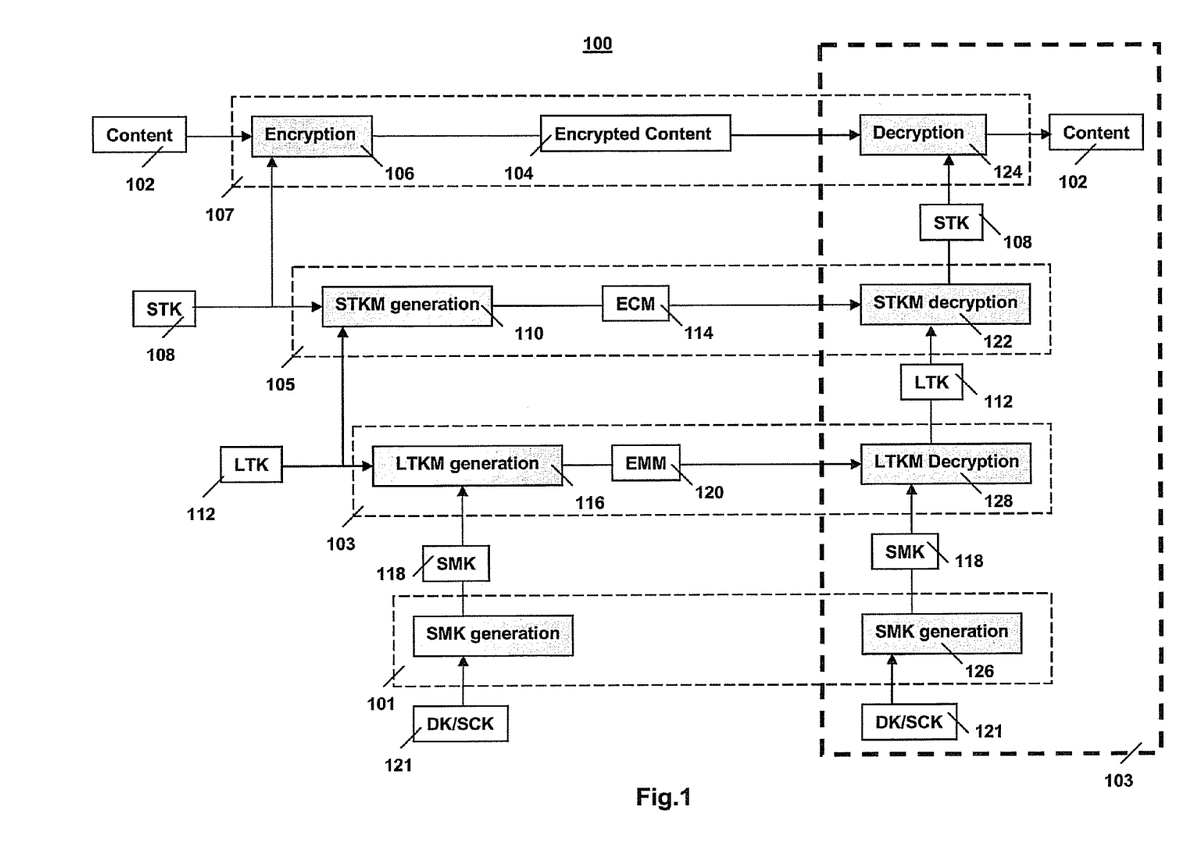
FIG. 1 is a block diagram of a conventional broadcast system.

FIG. 1 is a block diagram of a conventional broadcast system 100 wherein content information 102 is distributed and protected as encrypted content information 104 via a so-called 4-layer key hierarchy. The individual layers are identified with reference numerals 101, 103, 105 and 107. In such a system, content information 102 is encrypted in a system module 106 with a Short-Term Key (STK) 108, also referred to in the jargon as "Transport Encryption Key" or "Control Word", that is changed very frequently, e.g., in the order of once every ten seconds to ten times every second. The encrypted content stream is broadcast and this stream is targeted to all end-user devices, e.g. device 103. STK 108 is encrypted in a system module 110 with a long term key (LTK) 112, also referred to as "Service Key". These encrypted STKs 108 are carried in STK-messages 114, also referred to as "Entitlement Control Messages" (ECMs), and are broadcast as well synchronously with encrypted content 104. The LTKs 112 are changed less frequently, typically in the order of once an hour, once a day, once a week or once a month, or once per session in a pay-per-view scenario or a video-on-demand scenario. These LTKs 112 in turn are encrypted in a system module 116 with a secret key 118, e.g., a subscriber management key, that is derived from a further key 121 allocated to device 103 or stored on a smartcard issued to the user of device 103. These encrypted LTKs 112 can be distributed via the interactive channel or via the broadcast channel. The LTKs are carried inside LTK-messages 120, also referred to in the jargon as "Entitlement Management Messages" (EMMs). The LTK-messages 120 are targeted to individual end-user device 103 and are protected. Only a user who has subscribed to the service receives those LTK-messages 120. With the LTKs contained in messages 120, device 103 can decrypt ECM 114 in a module 122 and can subsequently decrypt encrypted content information 102 in a module 124. Key 118 is generated at device 103 in a module 126 from, e.g., the device key or smart card key 121 so as to generate key 118 for retrieving LTK 112 in a module 128. In other words, in order for device 103 to decrypt or unscramble the data stream, it must be kept informed about the current value of STK 108 that varies from one moment to the next. STK 108 is protected during transmission to device 103 by means of encryption. The encrypted STK 108 arrives at device 103 as an ECM 114. Device 103 has a module for decryption of encrypted STK 108, but only when it is authorized to do so. The authorization is sent to device 103 as EMM 120. The EMMs 120 are specific to each subscriber or to each group of subscribers, as identified by, e.g., a smart card in device 103 of the subscriber.

The inventors now propose the following for use in, e.g., layered key hierarchy systems, an example of which has been described above, or in any other system that uses a layer of fast-changing keys (e.g., the STKs), which change at a rate that is high compared to the play-out duration of the content information. Supplying the encrypted content information via a communication network needs adequate transmission capacity in the sense of bandwidth and/or time. Note that the LTKs, if used in the decryption scheme, are specific per individual end-user, and that the broadcasting or streaming thereof costs time as well. The STKs, however, are the same for all end-users. According to a scenario of the invention, the encrypted content information and, if a layered encryption scheme is used, the EMMs that carry the LTKs are distributed in advance among the end-users who have registered with the service provider. At the intended time of scheduled play-out, the service provider sequentially broadcasts, streams or otherwise provides, e.g., via a smart card, at least the ordered sequence of the fast-changing keys to enable decryption of the decrypted content stored at the receiver. As a result, communication bandwidth is being used efficiently in above proposed scenario. For example, the encrypted content information and EMMs are downloaded in the off-peak hours, freeing up bandwidth for use during the peak-hours. During the peak-hours, the service provider broadcasts, streams, etc., the fast-changing keys, using only marginal bandwidth as compared to the broadcast of the encrypted content information itself. An effect of this approach is that the service provider can use the allocated communication bandwidth for more channels than appears warranted by the available communication bandwidth from the perspective of the end-user, but still can warrant the play-out time of the content information.

Note that in a conventional decryption scheme, the encrypted content information is supplied in a transport stream multiplexed together with the encrypted decryption keys (e.g., the STKs and/or LTKs) or the encrypted decryption keys are simultaneously sent with the encrypted content information via an out-of-band channel.

Further, note that in case of conventionally managed time-shifted consumption of the content information, e.g., push video-on-demand or push audio-on-demand in the jargon, the user has to acquire the LTK messages at the time of requested play-out. The LTK messages grant the rights to access the corresponding content according to an individual access rights scheme negotiated at the time of subscription to the service. In the conventional decryption scheme, all individual users subscribed at the time of play-out obtain access rights from then on. It should be appreciated that the invention only requires broadcasting or otherwise distributing the order of sequence of STK messages which are identical for all subscribers in the group and that the individual negotiation of the access rights can be done any time beforehand.

More specifically, the invention relates to a method of providing a service to a specific one of a plurality of end-users for accessing content information, e.g., via data processing equipment of the end-user, e.g., a home entertainment network of the end-user, a set-top box, a personal computer, a smart-phone, a hand-held media player, etc. The content information comprises, e.g., a piece of music, a movie, a broadcast of a sports event, etc. The content information is provided to the specific end-user in an encrypted format in such a manner that both generic entitlement control data, e.g., the STKs, and specific entitlement management data, e.g., the LTKs, are needed in order for the specific end-user to decrypt the encrypted content information. The generic entitlement control data is the same for the plurality of end-users, whereas the specific entitlement management data is specific to the specific end-user. The method comprises providing the generic entitlement control data after the encrypted content information has been provided to the specific end-user. That is, encrypted content information and the generic entitlement control data for the content information as a whole are provided in disjoint time windows.

Note that the invention enables several business models. Consider, for example, a model wherein a service provider, e.g., a broadcaster, supplies the encrypted content information as well as the generic entitlement control data. Also consider a model wherein a certain party supplies the encrypted content information to the end-user, and another party supplies the generic entitlement control data. For example, the encrypted content information is provided for free to a person, e.g., on a DVD packed with particular merchandise, and the person has thereupon to register with a service provider in order to receive the generic entitlement control data so as to be able to access the content information encrypted on the DVD.

As mentioned above, a consequence of the invention is that it appears as if the service provider can provide more content information in a specific time slot than would be apparent from the allocated or used communication bandwidth. Accordingly, the service provider can broadcast live content information and at the same time broadcast the generic entitlement control data (e.g., the STKs) of other content information that is pre-stored in encrypted format at the user device.

In an embodiment of the method in the invention, the specific entitlement management data, e.g., the LTKs, is provided to the end-user together with the encrypted content information. Alternatively, the specific entitlement management data is provided to the end-user before the generic entitlement control data is provided but in a time window different from the time window wherein the encrypted content information is provided. For example, the specific entitlement management data is provided upon registering with the service and before the supply of the encrypted content information. Accordingly, the encrypted content information, the specific entitlement management data and the generic entitlement control data can all be supplied to the end-user in different phases. This phased supply enables the parties involved to choose a convenient scenario fitting their business model.

In an embodiment, the providing of the generic entitlement control data comprises communicating the generic entitlement control data, e.g., the STKs, via a first communication network to data processing equipment of the specific end-user. The rate of supply of the generic entitlement control data via the first communication network is then such that the equipment is enabled to render the content information to the specific end-user at the intended pace. The first communication network comprises, e.g., a data network of the service provider or the Internet. The ESG, mentioned above, provides the service information data that relates to the content information. The service information data provides metadata regarding the decryption of the encrypted content information using the generic entitlement control data received via the communication network and the rendering of the content information.

In an embodiment, the providing of the generic entitlement control data comprises providing a first physical data carrier, e.g., a smart card, for being used with data processing equipment of the specific end-user and storing the generic entitlement control data. The smart card is further configured to supply the generic entitlement control data, e.g., the STKs, in the proper sequence to a data processor that performs the decrypting of the encrypted content information in the data processing equipment of the specific end-user. The supply is synchronized with the reproduction of the content information to the end-user, upon activation of the card when connected to the equipment storing the encrypted content information. Alternatively, the first physical data carrier comprises, e.g., a memory stick, or a memory card. The equipment then has to be configured, e.g., by means of installing proper control software, to retrieve the relevant decryption keys from the memory in the proper sequence.

In a further embodiment, the encrypted content information is made available to the specific end-user via a second communication network for being stored at the data processing equipment of the specific end-user. Note that the first and second communication networks may, but need not, be identical. For example, the encrypted content is supplied via the Internet as a download, and the decryption keys are sequentially broadcasted using a television broadcast network.

The end-user stores the encrypted content information locally, e.g., at his/her equipment. This could be made an automated process that does not need user-intervention. An example of this embodiment uses disjoint time windows: one time window for supply of the content information in encrypted form, and another, later, time window for supply of the sequence of the STKs. The service provider thus is given control over the time of play-out independent of the time of supply of the encrypted content information. The service provider also is enabled to adjust to changing conditions and circumstances emerging only after supply of the encrypted content information. For example, the encrypted content information as supplied turns out to need revising or it emerges later on that the content provider has specified it can only be rendered after a certain time period, e.g., a month, has expired. A revised edition of the encrypted content information can then be supplied and overwrite the version stored at the end-user, or the service provider can reschedule the supply of the generic entitlement control data and update the ESG accordingly. As mentioned above, this control scenario makes it possible to efficiently use the bandwidth available to the service provider, by means of allocating the supply of bandwidth-intensive content information to one or more time windows (distributed over e.g., several hours or days) when bandwidth usage is not critical, as in off-peak hours, and allocating the supply of the sequence of decryption keys to a bandwidth-critical time window.

In a further embodiment, the encrypted content information is made available to the specific end-user on a second physical data carrier, different from the first physical data carrier mentioned above, for use with the data processing equipment of the specific end-user. This embodiment can be used in a business model wherein, for example, the second carrier with the encrypted content information is supplied for free upon registration with the service, and wherein the first carrier with the generic entitlement control data, is only conditionally made available, e.g., upon payment of a fee, or upon having collected a certain amount of bonus points in a store, or upon having attended a certain event, etc.

Within the context of a layered key encryption scheme, an example of which is the 4-layer key hierarchy system mentioned above, an embodiment of the method of the invention uses an encryption scheme with a layered key hierarchy involving a plurality of short-term keys (or: time variant keys that vary every few seconds) and a long-term key. The specific entitlement management data, provided to the end-user in advance, comprises the long-term key; and the generic entitlement control data comprises the short-term keys.

Accordingly, the invention mostly uses conventional procedures with regard to enabling an end-user to decrypt encrypted broadcast content information. However, the invention separates in time the delivery of the encrypted content information and the delivery of the STKs.

For conventional procedures please see, for example, US 20070124252; US 20030206636; US 20070226448; US 20060101485; US 20060123246; US 200800895; US 20060206708; EP1739967; WO2002052778; and EP1826931.

Above embodiments of the invention relate to the exploitation of the invention in the form of a method. The invention can also be exploited in another form.

The invention therefore also relates to data processing equipment configured for enabling a specific one of a plurality of end-users to access content information. The equipment has a first memory for storing the content information in encrypted format. The encrypted format is such that generic entitlement control data as well as specific entitlement management data are needed in order to decrypt the encrypted content information. The generic entitlement control data is the same for the plurality of end-users. The specific entitlement management data is specific to the specific end-user. The equipment has a second memory for storing the specific entitlement management data. The equipment has an interface for receiving the generic entitlement control data, e.g., via a data network or via a physical data carrier such as a memory card or a smart card. The equipment is configured for decrypting the encrypted content information in the first memory under control of the specific entitlement control data in the second memory, upon receipt of the generic entitlement control data via the interface. The configuration of the equipment for the decryption of the encrypted content information is brought about by, e.g., specific control software installed on the equipment. The specific control software identifies the encrypted content information in the first memory and the specific entitlement management data in the second memory upon receipt of the generic entitlement control data, the latter comprising an identifier of the encrypted content information. Upon identification, the specific control software retrieves the content information or pieces thereof and has the content information subjected to a decryption process under combined control of the specific entitlement management data in the second memory and the generic entitlement control data received via the interface. Examples of such equipment have been given throughout this text.

The invention also relates to control software stored on a physical data carrier and comprising computer-readable code for configuring data processing equipment to control accessing content information stored in an encrypted format in a first memory. The encrypted format is such that generic entitlement control data and specific entitlement management data are needed in order to decrypt the encrypted content information for a specific one of a plurality of end-users. The generic entitlement data is the same for the plurality of end-users. The specific entitlement management data is specific to the specific end-user and is stored in a second memory. The code comprises first instructions operative to control retrieval of the encrypted content information from the first memory upon receipt of the generic entitlement control data. The code comprises second instructions operative to control retrieval of the specific entitlement management data from the second memory upon receipt of the generic entitlement control data. The code comprises third instructions operative to decrypt the encrypted content information under combined control of the specific entitlement management data and the generic entitlement control data received. Upon installing of the control software on the data processing equipment, the user of the equipment is enabled to receive the service specified in the methods addressed above.

The invention is based on supplying the generic entitlement control data or the decryption keys, which are identical for all end-users who have subscribed to the service, only after the end-user has received the encrypted content information and after the end-user has received the subscription information comprised in the specific entitlement management data that specifies the individual rights to access the content information. This approach provides additional control over the conditions under which the content information is played-out by the end-user, and enables to temporally better manage the communication bandwidth available to the service provider.

Also note that a variation on the theme of the invention can be implemented by a method of providing a service to a plurality of end-users for accessing content information, wherein the content information is provided in an encrypted format using only generic entitlement control data in order for the end-users to decrypt the encrypted content information, instead of a combination of generic entitlement control data and specific entitlement management data, as in the examples above. The generic entitlement control data comprises a series of decryption keys, each next one of the decryption keys being used for decrypting a next one of multiple segments of the encrypted content information. The method comprises providing the series of decryption keys as a sequence, e.g., a temporal sequence in a broadcast or multicast, after the encrypted content information has been provided to the end-users. Accordingly, encrypted content information is stored in advance at the end-users and the decryption keys are provided later on as a temporal sequence so as to determine the play-out time of the content information.

BRIEF DESCRIPTION OF THE DRAWING

The invention is explained in further detail, by way of example and with reference to the accompanying drawing, wherein.

Throughout the Figures, similar or corresponding features are indicated by same reference numerals.

Detailed Embodiments

An embodiment of the invention introduced above relates to the service provider remotely controlling the rendering of encrypted content information at a data processing device of an end-user, wherein the encrypted content information has been made available to the user in advance. The encrypted content information is made available in advance, e.g., as pre-installed at the device, downloaded at the device via a data network from a unicast, multicast or broadcast, supplied on a data carrier such as an optical disc or a memory card, etc. The rendering is triggered by the device receiving the decryption keys, broadcast or streamed under conditions that are under control of the service provider and can be announced in the service information data comprised in the ESG.

Figure 2:
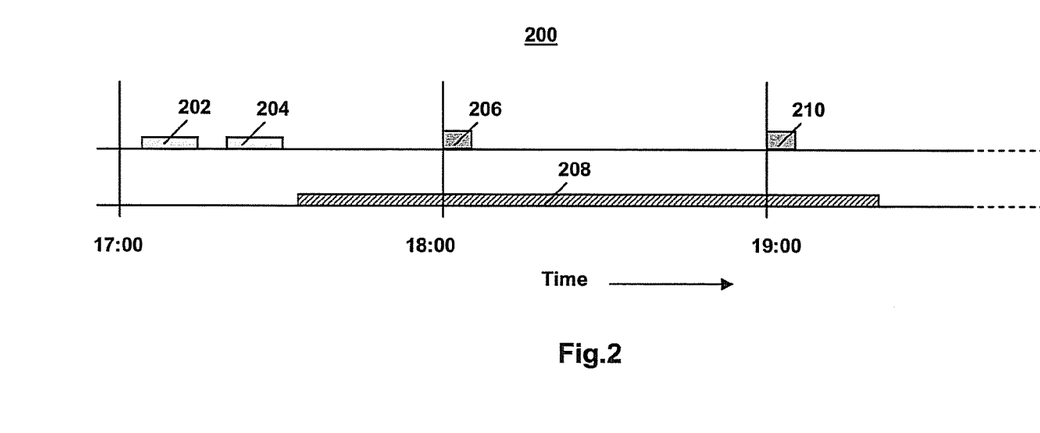
FIG. 2 is a timing diagram illustrating the invention.

FIG. 2 is a timing diagram 200 illustrating operation of the invention from the point of view of the service provider and in a particular scenario, wherein the user of the data processing device has subscribed to, e.g., a news broadcast service. The user is given access to the content information provided by this service in a manner as if it were a live news broadcast. To this end, the service provider distributes in advance the encrypted content information in portions 202 and 204 to the device of the user and to the devices of other subscribers using a push model. Encrypted content information 202 and 204 is representative of recent news items. The distribution is spread out over time under conditions governed by, e.g., communication bandwidth available to the service provider. In the example shown, the encrypted content information is provided in multiple portions 202 and 204 in multiple disjoint time slots. At 18:00, the service provider broadcasts the decryption keys in an ordered sequence. If the user has enabled his/her device, the device starts rendering the content information portions 202 and 204 upon receipt of the relevant decryption keys and the user has the impression that he/she is watching a live broadcast. In the meantime, the service provider is broadcasting another program 208, e.g., a live sports event in a conventional manner, i.e., unencrypted or encrypted with the decryption keys (e.g., the STKs) for this program multiplexed with the encrypted content information. As the decryption keys for the news broadcast consume little bandwidth, they can be multiplexed with the live broadcast as well. The decryption keys for the news broadcast 210 are again transmitted at 19:00, enabling again to render the stored content information.

Figure 3:
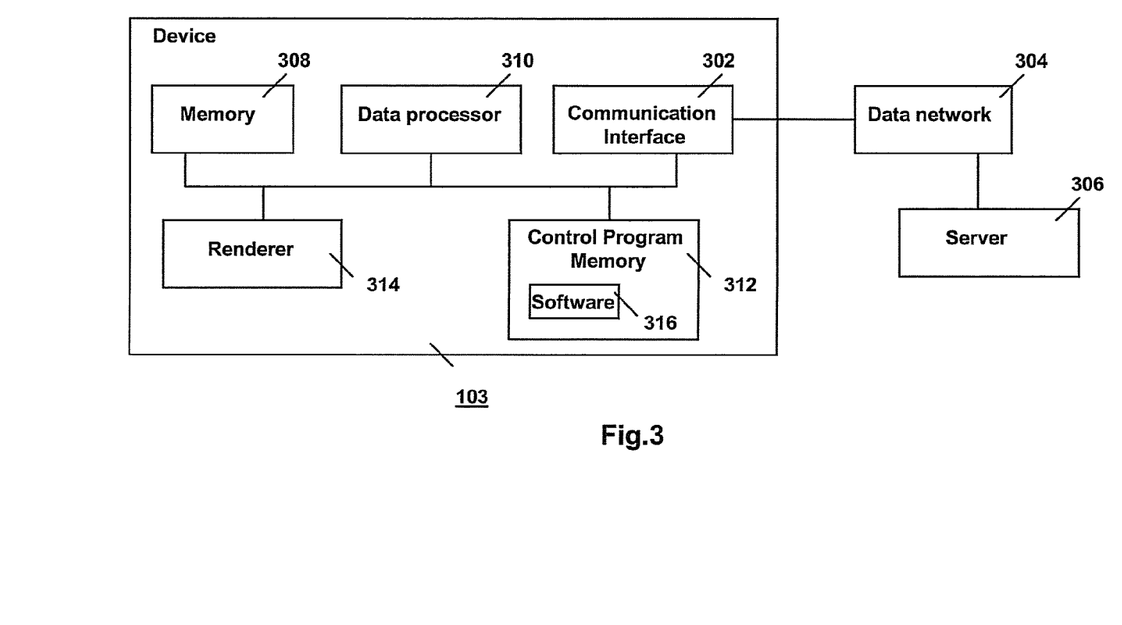
FIG. 3 is a block diagram of a data processing device in the invention.

FIG. 3 is a block diagram of a data processing device 103 in the invention. In the example shown, device 103 is a mobile device such as a smart-phone providing mobile TV functionality. To this end, device 103 has a communication interface 302 to a data network 304 used by a service provider to broadcast content information from a server 306. The content information is broadcast in encrypted format via data network 304 (or another communication network). In order to decrypt the encrypted content information, device 103 needs a temporal sequence of decryption keys, e.g., STKs 108. Device 103 is configured to receive the encrypted content information and to store the encrypted content information in a memory 308, all without user intervention and under control of the service information data supplied by the ESG. To this end, device 300 has a data processor 310 (or: a controller 310) that is operative to automatically write the received encrypted content information as data to memory 308 under control of specific control software 316 stored in a program memory 312. Later on, as announced in the ESG, the service provider makes the decryption keys available as a temporal sequence, for decrypting the encrypted content information buffered in memory 308. The temporal sequence is broadcast via data network 304 and is received by device 103. Under control of the control software 316 and the key currently received, data processor 310 retrieves the data, representative of the relevant segment of the encrypted content, from memory 308 and decrypts the relevant segment with the key currently received. The decrypted content information is then rendered in a rendering component 314, e.g., a loudspeaker or a display monitor. As specified in the examples above, the decryption keys that are sequentially being made available include the STKs. In an embodiment that uses a layered encryption scheme also involving LTKs, the LTKs are provided in advance, e.g., together with the encrypted content information, and are stored in, e.g., memory 312.

Figure 4:
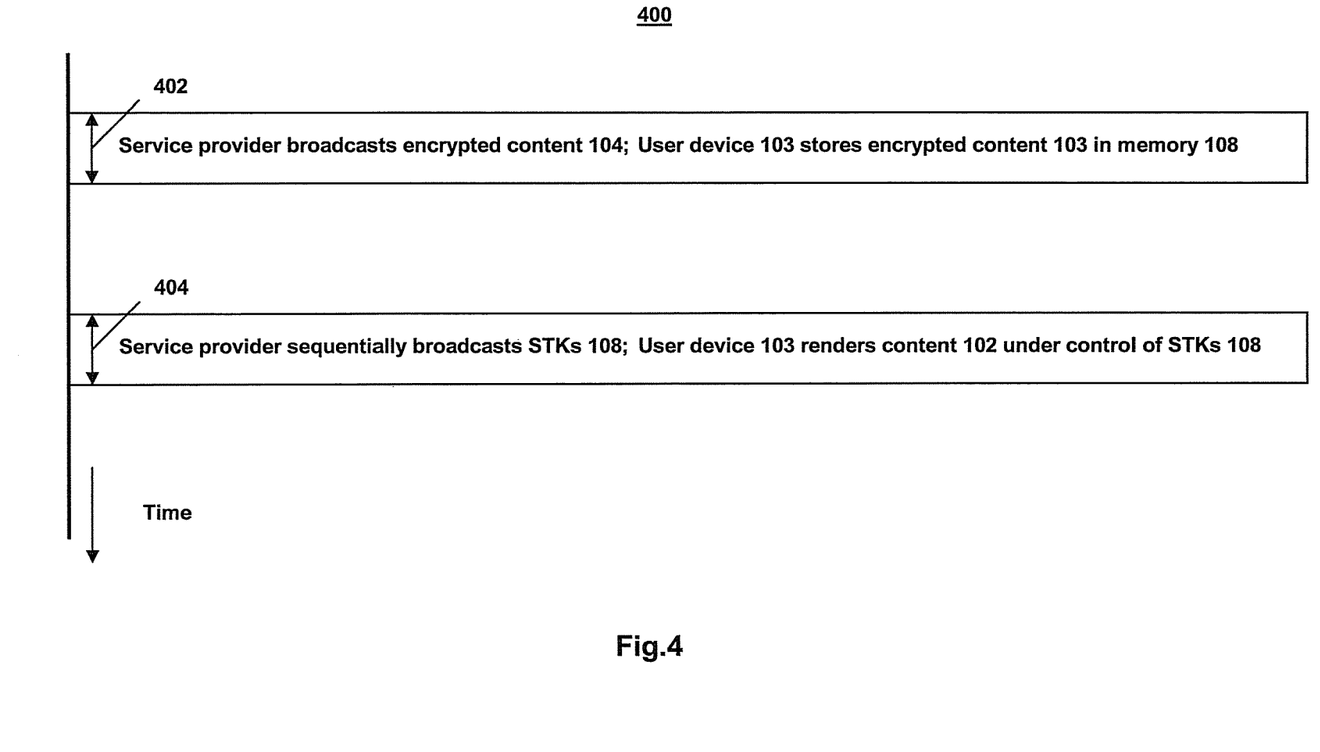
FIG. 4 is a simple timing diagram illustrating an embodiment of the invention.

FIG. 4 is a timing diagram 400 illustrating an embodiment of the invention. In a time slot 402, the service provider broadcasts encrypted content information 104, and user device 103 stores encrypted content 103 in memory 108. In a disjoint time slot 404, separated in time from slot 402 by a suitable length of time, the service provider sequentially broadcasts STKs 108. Upon receipt of STKs 108, device 103 decrypts encrypted content 103 and renders content 102.

Several business models can be based on the invention, some examples of which have been addressed above.

As yet another example, consider a study course provided to students in electronic format, wherein the students have to submit assignments and homework to their tutors via a data network such as the Internet. The course comprises a plurality of modules in a sequence. The sequence represents the logical configuration of the materials to be studied and mastered. The modules are provided as a whole, e.g., on DVDs or downloaded via the Internet, but are encrypted. The encrypted modules supplied to an enrolled student also comprise the specific entitlement management data specific to this individual student. The generic entitlement data for a next module is only provided to the specific student in a next one of particular time periods in one of the manners described above. In this manner, the progress of the course is then more or less synchronized to a schedule, which is convenient to the tutors. Also, if the course's material is handed out well ahead of time all students can timely check that they have received the materials before the course starts.

As still another example, consider a company, a theme park, a store, etc., which provides to their customers a piece of content information for free, e.g., guidance information, a movie clip, a documentary, a piece of music, a multimedia presentation, etc. The customers have individually registered with the company, theme park, store, etc., on a previous occasion. The content information is encrypted. In order for the customer to render the content information at their mobile device, they need the generic entitlement control data. The company, theme park, store, etc., provides the generic entitlement control data via a short range broadcast at their premises or via a barcode or another computer readable code fixed to a physical data carrier (physical object) at the premises. Accordingly, the customers are enabled to have the content information rendered on a pre-determined geographical site. This may, in one scenario serve as an incentive to the customers to revisit the site, and in another scenario control the rendering in dependence of the geographic location of the customer.

Embodiments of the invention have been specified in the appended claims. The invention also includes embodiments having a combination of features listed in different claims.

The invention claimed is:

1. A method of providing a service to one or more specific end-users out of a plurality of end-users for accessing content information in a controlled manner, wherein:

the content information is provided to the one or more specific end-users in an encrypted format in such a manner that generic entitlement control data and specific entitlement management data are needed in order for the one or more specific end-users to decrypt the encrypted content information and such that the generic entitlement control data is the same for the all of the one or more specific end-users and the specific entitlement management data is specific to each of the one or more specific end-users; and the generic entitlement control data is provided to all of the one or more specific end-users after the encrypted content information has been provided to the one or more specific end-users;

wherein the content information is provided to the one or more specific end-users at non-peak hours in regard to bandwidth availability on the first communication network, and the generic entitlement control data is provided to the one or more specific end-users during peak hours in regard to bandwidth availability in the first communication network.

2. The method of claim 1, wherein the specific entitlement management data is provided to the one or more specific end-users together with the encrypted content information.

3. The method of claim 1, wherein the providing of the generic entitlement control data comprises communicating the generic entitlement control data to data processing equipment of the one or more specific end-users via a first communication network.

4. The method of claim 1, wherein the providing of the generic entitlement control data comprises providing a first physical data carrier for being used with data processing equipment of the one or more specific end-users and storing the generic entitlement control data.

5. The method of claim 3, wherein the encrypted content information is made available to the one or more specific end-users via a second communication network, different from the first communication network, for being stored at the data processing equipment.

6. The method of claim 4, wherein the encrypted content information is made available to the one or more specific end-users on a second physical data carrier, different from the first physical data carrier, for use with the data processing equipment.

7. The method of claim 2, wherein:
the content information is encrypted using an encryption scheme with a layered key hierarchy involving a plurality of short-term keys and a long-term key;
the specific entitlement management data comprises the long-term key; and
the generic entitlement control data comprises the short-term keys.

8. Data processing equipment configured for enabling a one or more specific end-users out of a plurality of end-users to access content information, wherein:
the equipment has a first interface and first memory for respectively receiving and storing the content information in an encrypted format, the encrypted format is such that generic entitlement control data and specific entitlement management data are needed in order to decrypt the encrypted content information and such that the generic entitlement control data is the same for the plurality of end-users and the specific entitlement management data is specific to each one of the one or more specific end-users;
the equipment has a second memory for storing the specific entitlement management data;
the equipment has a second interface for receiving the generic entitlement control data; and
the equipment is configured to decrypt the stored encrypted content information in the first memory under control of the specific entitlement control data in the second memory upon receipt of the generic entitlement control data via the interface at a point in time after receiving and storing the content information;
wherein the equipment is configured to receive the content information at non-peak hours in regard to bandwidth availability on the cellular or satellite based network, and is configured to receive the generic entitlement control data during peak hours in regard to bandwidth availability on the cellular or satellite based network.

9. Control software stored on a non transitory computer readable medium and comprising computer-readable code for configuring data processing equipment to control accessing content information stored in an encrypted format in a first memory, wherein:
the encrypted format is such that generic entitlement control data and specific entitlement management data are needed in order to decrypt the encrypted content information for one or more specific end-users out of a plurality of end-users;
the generic entitlement data is the same for the plurality of end-users;
the specific entitlement management data is specific to each of the one or more specific end-users and is stored in a second memory;
the code comprises first instructions operative to cause the data processing equipment to retrieve the encrypted content information from the first memory after receipt of the generic entitlement control data;
the code comprises second instructions operative to cause the data processing equipment to retrieve the specific entitlement management data from the second memory after receipt of the generic entitlement control data;
the code comprises third instructions operative to cause the data processing equipment to decrypt the encrypted content information under combined control of the specific entitlement management data and the generic entitlement control data;
wherein the code comprises instructions operative to cause the data processing equipment to receive the content information at non-peak hours in regard to bandwidth availability on the cellular or satellite based network, and to receive the generic entitlement control data during peak hours in regard to bandwidth availability on the cellular or satellite based network.

10. The method of claim 1, wherein the first communication network is a cellular or satellite based network.

11. The equipment of claim 8, wherein the first interface connects the equipment to a cellular or satellite based network.

12. The control software of claim 9, wherein the data processing equipment is coupled to a cellular or satellite based network.

* * * * *